United States Patent
Im

(10) Patent No.: US 8,206,641 B2
(45) Date of Patent: Jun. 26, 2012

(54) METHOD FOR MAKING CERAMIC-COLORING CLAY BRICKS USING WASTE BATTERIES POWDER

(76) Inventor: Hyong Hag Im, Gyeonggi-do (KR)

( * ) Notice: Subject to any disclaimer, the term of this patent is extended or adjusted under 35 U.S.C. 154(b) by 398 days.

(21) Appl. No.: 12/528,354

(22) PCT Filed: Feb. 20, 2008

(86) PCT No.: PCT/KR2008/000982
§ 371 (c)(1),
(2), (4) Date: Aug. 24, 2009

(87) PCT Pub. No.: WO2008/108544
PCT Pub. Date: Sep. 12, 2008

(65) Prior Publication Data
US 2010/0090377 A1  Apr. 15, 2010

(30) Foreign Application Priority Data

Mar. 5, 2007 (KR) .................. 10-2007-0021344
Dec. 12, 2007 (KR) .................. 10-2007-0129022

(51) Int. Cl.
*B28B 3/20* (2006.01)
*C04B 35/64* (2006.01)

(52) U.S. Cl. ......... 264/638; 264/680; 264/652; 501/141

(58) Field of Classification Search ................ 264/680, 264/638
See application file for complete search history.

(56) References Cited

U.S. PATENT DOCUMENTS

| 4,340,555 | A * | 7/1982 | Procter | 264/648 |
| 2005/0170945 | A1* | 8/2005 | Stubbs et al. | 501/141 |
| 2008/0023889 | A1* | 1/2008 | Cheshire et al. | 264/644 |

FOREIGN PATENT DOCUMENTS

| DE | 4337546 A1 | 5/1995 |
| JP | 61281267 A | 12/1986 |
| JP | 2007012527 A | 1/2007 |
| KR | 20040020681 A | 3/2004 |
| KR | 20050036354 A | 4/2005 |

OTHER PUBLICATIONS

KR 10-2004-0020681 (Lee et al.) Mar. 9, 2004 (English language machine translation of IDS document cited Aug. 24, 2009). [online] [retrieved Nov. 23, 2011]. Retrieved from: Korean Patent Information Online Network.*

JP 61-281467 A (Nanbe et al.) Dec. 11, 1986 (English language translation of IDS document cited Aug. 24, 2009).*

* cited by examiner

*Primary Examiner* — Matthew Daniels
*Assistant Examiner* — Erin Snelting
(74) *Attorney, Agent, or Firm* — Rabin & Berdo, P.C.

(57) ABSTRACT

Provided is a method for making a ceramic clay brick using waste battery powder. Valuables of the waste batteries are separated through a crushing, pyrolysis, pulverizing, and magnetic separation processes. The remaining waste battery powder is processed in order to utilize the remaining waste battery powder as a colorant in a brick making process. Clay powder is added to the processed waste battery powder to make a black-colored, dark red-colored, or dark brown-colored brick according to its contents. According to the present invention, since the waste battery powder mainly including manganese and zinc can be processed into the colorant and mixed with the clay powder to make the black-colored, dark red-colored, or dark brown-colored brick according to its contents, purchase costs $MnO_2$ used as the colorant during the making process of the ceramic brick can be remarkably reduced. In addition, superior bricks can be made at low cost.

4 Claims, No Drawings

METHOD FOR MAKING CERAMIC-COLORING CLAY BRICKS USING WASTE BATTERIES POWDER

BACKGROUND OF THE INVENTION

1. Field of the Invention

The present invention relates to a method for making ceramic-coloring clay bricks that are used as building bricks and flooring blocks, and more particularly, to a method for making ceramic-coloring clay bricks in which waste battery powder is processed into a colorant, and the processed battery powder is mixed with a clay mixture to make the ceramic-coloring clay bricks through forming and burning processes.

2. Description of the Related Art

In general, ceramic clay bricks are made using the following processes. A clay mixture in which clay such as loess and mud is mixed with sand or sandy clay is finely pulverized and kneaded. The kneaded clay mixture is cut into bricks having predetermined size while extruding the kneaded clay mixture in a brick form using a vacuum extrusion pug mill. The extruded bricks having the predetermined size are dried and burned to make the ceramic clay bricks.

A colorant can be added to the clay mixture during the processes of making the ceramic clay bricks to make bricks having various colors.

For example, if white kaolin is added, a white-colored brick is made, if titanium dioxide ($TiO_2$) is added, a yellow-colored brick is made, and if manganese dioxide ($MnO_2$) is added, a black-colored, dark red-colored, or dark brown-colored brick (hereinafter, referred to as a black brick) is made according to its contents.

SUMMARY OF THE INVENTION

Particularly, among the bricks having the various colors, the black brick that is made using $MnO_2$ as the colorant is relatively widely used when compared to the white brick and the yellow brick. Hence, the most brick makers, in actual, most commonly make the black brick.

As the consumption of the black brick increases, the consumption of the colorant, i.e., $MnO_2$, increases in proportion to the consumption of that. It is urgently required, therefore, to reduce brick-making costs by reducing purchase costs of $MnO_2$.

An object of the present invention is to provide a method for making a ceramic clay brick using waste battery powder, wherein valuables of waste batteries (e.g., iron pieces for the outer cover of the waste batteries, zinc, and carbon rod) are separated through a crushing, pyrolysis, pulverizing, and magnetic separation processes, the remaining waste battery powder is processed into a colorant for the ceramic clay brick, and clay powder is added to the waste battery powder to make a black-colored, dark red-colored, or dark brown-colored brick according to its contents.

According to an aspect of the present invention, there is provided a method for making a ceramic clay brick using waste battery powder, the method including: pulverizing a clay mixture to a particle size ranging from about 0.5 mm to about 2 mm using a roller mill, wherein the clay mixture includes about 70% by weight of clay, about 20% to about 28% by weight of sand or sandy clay, and about 2% to about 10% by weight of pulverized powder obtained from waste battery for being used as a brick colorant; after mixing and kneading the pulverized clay mixture with water to give a moisture content of about 18% to about 22%, cutting the extruded clay mixture into bricks having a predetermined size while extruding the kneaded clay mixture in a brick form using a vacuum extrusion pug mill; putting the bricks into a drying chamber to dry the bricks for about 30 hours to about 40 hours until the bricks has a moisture content of about 0% to about 5%; and preheating the dried bricks at a temperature ranging from room temperature to about 1000° C., burning the preheated bricks at a temperature ranging from about 1000° C. to about 1200° C., and cooling the burned bricks at a temperature ranging from about 1200° C. to room temperature in a continuous kiln.

According to another aspect of the present invention, there is provided a method for making a ceramic clay brick using waste battery powder, wherein the pulverized powder used in the pulverizing of the clay mixture is obtained from the waste battery by separating valuables from the waste battery (e.g., iron pieces for the outer cover of the waste batteries, zinc, and carbon rod) through crushing, pyrolysis, pulverizing, and magnetic separation processes, and removing chlorine (Cl) from remaining powder, wherein the pulverized power includes about 6% to about 10% by weight of carbon and about 90% to about 94% by weight of Mn/Zn-based compound.

DETAILED DESCRIPTION OF THE INVENTION

Hereinafter, reference will now be made in detail to the preferred embodiments of the present invention.

In a method for making a ceramic-coloring clay brick according to an embodiment of the present invention, powder recovered from a waste battery such as a manganese battery or an alkaline battery is processed into a brick colorant. The processed battery powder is mixed with clay powder to make a black-colored, dark red-colored, or dark brown-colored brick according to its contents.

In order to use the waste battery powder as the brick colorant, components of the waste battery powder must be first examined. Typically, the manganese battery includes $MnO_2$ and Zn as anode and cathode active materials and neutral salt solution such as $NH_4C$; or $ZnCl_2$ as electrolyte. The alkaline battery includes $MnO_2$ and Zn as the anode and cathode active materials and KOH solution as the electrolyte.

An iron-clad battery includes an iron pipe as an outer cover and occupies about 80% of the total production of the manganese and alkaline batteries. This iron-clad battery is dismantled using a crushing process. A manganese battery for a lantern (battery size code 4R25, hereinafter, referred to as a lantern battery) includes a paper or a resin based polypropylene as an outer cover and is composed of four manganese batteries surrounded by Zn and each having 1.5 V, which are connected in series and together generate 6V DC. This lantern battery is dismantled using a pyrolysis process because a carbon rod must be recovered, and also, Zn must be recovered through melting and freezing processes.

The waste battery compositively includes iron, zinc, the carbon rod, packing materials, Zn-oxide, $MnO_2$, Mn(OH), and Ca-oxide because various chemical reactions are compositively generated by mixing with the electrolyte due to discharging and crushing of the waste battery.

Chlorine (Cl) is unsuitable to components of the brick colorant. Hence, chlorine must be separated from chlorinated compounds, e.g., $ZnCl_2$, $NH_4Cl$, etc, included in the waste battery powder. Chlorine is separated and oxidized from the chlorinated compounds due to a weak coupling force thereof in a process in which temperature increases during the burning process of the bricks. The resulting $Cl_2$ gas and HCl gas may be emitted into the atmosphere. Since these gases are classified as air pollutants, emission thereof is restricted.

Therefore, chlorine must be first removed from the waste battery powder.

As described above, since chlorine is separated and oxidized from the chlorinated compounds, e.g., $ZnCl_2$, $NH_4Cl$, etc, at low temperatures of about 300° C. due to weak coupling force thereof, the $Cl_2$ and HCl gases may be evaporated when the waste battery powder is conveyed into a screw conveyer in which temperature increases at about 300° C. or more due to electric heater wires wound therearound.

Here, the final waste battery powder in which the $Cl_2$ and HCl gases are evaporated can be employed as a target brick colorant. The evaporated gases pass through a $Ca(OH)_2$ solution to precipitate $CaCl_2$ using a semi-dry absorption method which is one example of exhaust gas purifying methods. The precipitated $CaCl_2$ is recycled. The chemical equation is given as the following chemical equation.

The overall reaction of $Cl_2$ is shown in the following Equation 1.

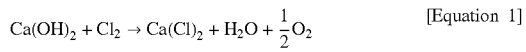

$$Ca(OH)_2 + Cl_2 \rightarrow Ca(Cl)_2 + H_2O + \frac{1}{2}O_2 \quad \text{[Equation 1]}$$

The overall reaction of HCl is shown in the following Equation 2.

$$Ca(OH)_2 + 2HCl \rightarrow Ca(Cl)_2 + 2H_2O \quad \text{[Equation 2]}$$

Processes of obtaining the waste battery powder described above will be described as follows before a method for making the clay bricks according to the present invention is described in detail.

In order to obtain the waste battery powder, collected waste batteries are first classified into the iron-clad battery and the lantern battery. The classified iron-clad battery is crushed using a crusher and then is pulverized using a pulverizer to form fine powder. The fine powder is separated using a vibratory separator having a wire mesh for a vibrating screen to obtain first powder fallen through the wire mesh.

In the powder having a large particle size, combustible wastes, and iron pieces for the outer cover of the battery which remain on the wire mesh, the iron pieces are separated using a magnetic separator. The combustible wastes and the lantern battery are put together into a thermal cracking furnace to completely carbonize them through thermal cracking. Then, blocky remnants such as carbon rods and zinc cases are recovered and recycled through an adequate method, and the remaining remnants are again pulverized to obtain second powder.

The first powder and second powder obtained from the waste batteries through the above processes are heat-treated using the semi-dry absorption method to form the brick colorant. The brick colorant includes carbon and an Mn/Zn-based compound mainly including manganese and zinc. Preferably, the Mn/Zn-based compound contains about 6% to about 10% by weight of the carbon and about 90% to about 94% by weight of the Mn/Zn-based compound.

When the brick colorant is prepared, the clay mixture which contains about 70% by weight of clay such as loess and mud, about 24% to about 28% by weight of sand or sandy clay, and about 90% to about 94% by weight of the brick colorant is pulverized to a particle size ranging from about 0.5 mm to about 2 mm using a roller mill.

The pulverized clay mixture is mixed and kneaded with water to give a moisture content of about 18% to about 22%. Then, the kneaded clay mixture is cut into bricks having predetermined size while extruding the kneaded clay mixture in a brick form using a vacuum extrusion pug mill.

The extruded bricks are put into a drying chamber to dry the bricks for about 30 hours to about 40 hours until the bricks have a moisture content of about 0% to about 5%.

The dried bricks are preheated at a temperature ranging from room temperature to about 1000° C., burned at a temperature ranging from about 1000° C. to about 1200° C., and cooled at a temperature ranging from about 1200° C. to room temperature in a continuous kiln to complete a making process of the ceramic clay brick.

Although a heat-treatment applying the "semi-dry absorption method" is described as a method in which chlorine is removed from the waste battery powder to obtain the brick colorant, the present invention is not limited thereto. For example, various methods such as a "water treatment" in which the waste battery powder is washed with water and then is dried may be applied to the present invention.

Hereinafter, a preferred embodiment of a method for making the ceramic clay brick using the waste battery powder according to the present invention will be described.

Embodiment

Iron-clad waste battery powder mainly including about 70% by weight of red clay, about 25% by weight of sandy clay, manganese, and zinc is heat-treated into a brick colorant. About 5% by weight of the brick colorant is mixed with clay powder. The clay mixture is pulverized to a particle size of about 2 mm using a roller mill. The pulverized clay mixture is mixed and kneaded with water to give moisture content of about 20%. The kneaded clay mixture is cut into bricks having predetermined size while extruding the kneaded clay mixture in a brick form using a vacuum extrusion pug mill. Successively, the extruded bricks are put into a drying chamber to dry the bricks for about 30 hours to about 40 hours until the bricks have a moisture content of about 0% to about 5%. The dried bricks are preheated at a temperature ranging from room temperature to about 1000° C., burned at a temperature ranging from about 1000° C. to about 1200° C., and cooled at a temperature ranging from about 1200° C. to room temperature in a continuous kiln to make dark-colored ceramic clay bricks.

The brick colorant powder of about 5% by weight includes about 8.87% by weight of a carbon and about 91.12% by weight of an Mn/Zn-based compound. The Mn/Zn-based compound includes about 42.18% by weight of the manganese, about 49.14% by weight of zinc, and about 8.68% by weight of calcium.

Compressive strength (more than 20.59 $N/mm^2$) and absorption (less than 10%) of the ceramic clay brick made according to this embodiment are tested according to the Korean Industrial Standard of KSL 4210, and the results are given in Table 1. The results confirm that it meets the Korean Industrial Standard as shown in Table.

TABLE 1

| Compressive strength (N/mm 2) | Absorption (%) | Color |
|---|---|---|
| 29~41 | 7~9 | Dark brown |

According to the present invention as described above, since the waste battery powder mainly including manganese and zinc is processed into the colorant and mixed with the clay powder to make the black-colored, dark red-colored, or dark brown-colored brick according to its contents, purchase costs of $MnO_2$ used as the colorant during the making process of the black-colored, dark red-colored, or dark brown-colored ceramic clay brick, which is highly demanded among conventional ceramic clay bricks and is made by the most brick makers, can be remarkably reduced. In addition, superior bricks can be made at low cost. Particularly, since the waste batteries are recycled, environmental pollution can be prevented and economic effects can be expected due to the waste recycling.

As described above, the method for making the ceramic clay brick using the waste battery powder is not limited to the above embodiment. It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for making a ceramic clay brick using waste battery powder, the method comprising:
   obtaining waste batteries and pulverizing the waste batteries to obtain a pulverized powder;
   pulverizing a clay mixture to a particle size ranging from about 0.5 mm to about 2 mm using a roller mill, wherein the clay mixture includes about 70% by weight of clay, about 20% to about 28% by weight of sand or sandy clay, and about 2% to about 10% by weight of the pulverized powder for being used as a brick colorant;
   mixing and kneading the pulverized clay mixture with water to give a moisture content of about 18% to about 22%, then
   extruding the kneaded clay mixture in a brick form using a vacuum extrusion pug mill and cutting the extruded clay mixture into bricks having a predetermined size;
   putting the bricks into a drying chamber to dry the bricks for about 30 hours to about 40 hours until the bricks have a moisture content of about 0% to about 5%; and
   preheating the dried bricks at a temperature ranging from room temperature to about 1000° C., burning the preheated bricks at a temperature ranging from about 1000° C. to about 1200° C., and cooling the burned bricks at a temperature ranging from about 1200° C. to room temperature in a continuous kiln.

2. The method of claim 1, wherein the pulverized powder used in the pulverizing of the clay mixture is obtained from the waste batteries by recovering iron pieces, zinc and carbon rod from the waste batteries through crushing, pyrolysis, pulverizing, and magnetic separation processes, and
   the method further includes a step of removing chlorine (Cl) from the pulverized powder before the step of pulverizing the clay mixture.

3. The method of claim 2, wherein the pulverized powder includes carbon and an Mn and Zn-based compound, and the chlorine (Cl) is removed from pulverized powder by either a heat-treatment process at about 300° C. or more or a washing process using water.

4. The method of claim 3, wherein the pulverized power includes about 6% to about 10% by weight of the carbon and about 90% to about 94% by weight of Mn and Zn-based compound.

* * * * *